United States Patent [19]
Fukami et al.

[11] Patent Number: 5,210,761
[45] Date of Patent: May 11, 1993

[54] DIGITAL SIGNAL PROCESSING CIRCUIT

[75] Inventors: Tadashi Fukami; Tsutomu Kajiwara, both of Kanagawa, Japan

[73] Assignee: Sony Corporation, Tokyo, Japan

[21] Appl. No.: 607,706

[22] Filed: Nov. 1, 1990

[30] Foreign Application Priority Data

Dec. 30, 1989 [JP] Japan .................................. 1-340262

[51] Int. Cl.⁵ .............................................. G11B 5/09
[52] U.S. Cl. ...................................... 371/40.1; 360/32
[58] Field of Search .................. 360/48, 32; 371/38.1, 371/39.1, 40.1, 44, 69.1

[56] References Cited
U.S. PATENT DOCUMENTS
4,862,105 7/1989 Kurz .

FOREIGN PATENT DOCUMENTS
0137425 4/1985 European Pat. Off. .
0235782 9/1987 European Pat. Off. .
2520914 2/1983 France .
2118351 10/1983 United Kingdom .

Primary Examiner—Vincent P. Canney
Attorney, Agent, or Firm—Hill, Steadman & Simpson

[57] ABSTRACT

A digital signal processing circuit has a memory circuit to store reproduction data and recording information, a reproduction signal processing circuit for demodulating a reproduction signal to thereby obtain the reproduction data and the recording information and for storing the reproduction data and the recording information into the memory circuit, an error detecting and correcting circuit for executing an error detecting and correcting process on the reproduction data, and a data output circuit for outputting the reproduction data stored in the memory circuit on the basis of the recording information. The digital signal processing circuit incorporates a plurality of multiplex coincidence detecting circuits for sequentially detecting whether the recording information coincides or not and for outputting the recording information, in which the coincidence result is respectively obtained by only a predetermined number of times, to the memory circuit; and a selecting circuit for selectively outputting the recording information to the plurality of multiplex coincidence detecting circuits in accordance with the kind of recording information.

2 Claims, 6 Drawing Sheets

DIGITAL SIGNAL PROCESSING CIRCUIT

BACKGROUND OF THE INVENTION

1. Field of the Invention

The present invention relates to a digital signal processing circuit which can be applied to a digital audio tape recorder for recording and reproducing a digital audio signal, and the like.

2. Description of the Prior Art

Hitherto, in a magnetic recording and reproducing apparatus, there has been known an apparatus in which a digital audio signal can be recorded and reproduced by using a rotary drum (hereinafter, referred to as a digital audio tape recorder).

That is, upon recording, the digital audio signal is divided into blocks and an interleaving process is executed every block.

Further, after an inner code and an outer code for error detection and correction is formed on a block unit basis, the interleave processed digital audio signal is converted into the recording signal together with the sampling frequency information and time information, and the like (hereinafter, referred to as recording information of the digital audio signal) and is output to magnetic heads.

Due to this, the digital audio signal is recorded into a predetermined area in a main data area. The recording information is converted into subdata and recorded into predetermined areas in the main data area and subdata area.

On the other hand, upon reproduction, the reproduction signal is demodulated by a demodulating circuit and errors in the reproduction data thus obtained are corrected by an error detecting and correcting circuit.

Further, the reproduction data which was subjected to the error detecting and correcting process is subjected to a deinterleave process by an output circuit, converted into an analog signal, and supplied to an output.

At this time, the reproduction data is processed on the basis of the subdata. Due to this, the digital audio signal can be reproduced on the basis of the recording information recorded on a magnetic tape together with the digital audio signal.

Since the recording information is important to processing the reproduction data, in such a kind of digital audio tape recorder, one recording information is repetitively recorded onto the magnetic tape.

Therefore, in the conventional digital audio tape recorder, a check is made to see if the recording information which is repetitively reproduced coincides or not, and the reproduction data is processed by using the recording information in which a coincidence result is obtained.

However, when the magnetic tape is reproduced, it is impossible to avoid the generation of errors. If the reproduction data is merely processed by using the recording information in which the coincidence result was obtained, there is a problem in that it is difficult to process the reproduction data with certainty, and it is necessary to determine whether the recording information is correct or incorrect by additionally using, for instance, an operation processing unit.

OBJECTS AND SUMMARY OF THE INVENTION

It is, therefore, an object of the present invention to provide a digital signal processing circuit in which reproduction data can be certainly processed by a simple construction.

According to an aspect of the present invention, there is provided a digital signal processing circuit having a memory circuit to store reproduction data and recording information, a reproduction signal processing circuit for demodulating a reproduction signal to thereby obtain the reproduction data and the recording information and for storing the reproduction data and the recording information in the memory circuit, an error detecting and correcting circuit for executing an error detecting and correcting process on the reproduction data, and a data output circuit for outputting the reproduction data stored in the memory circuit in response to recording information, comprising:

a plurality of multiplex coincidence detecting circuits for sequentially detecting whether the recording information coincides or not and for outputting the recording information to the memory circuit for which information the coincidence result is respectively obtained by only a predetermined number of times; and a selecting circuit for selectively outputting the recording information to the plurality of multiplex coincidence detecting circuits in accordance with the kind of recording information.

BRIEF DESCRIPTION OF THE DRAWINGS

FIGS. 4A to F, FIG. 5A to F and FIG. 6A to E are signal waveform diagrams which are used to explain the operation.

DETAILED DESCRIPTION OF THE PREFERRED EMBODIMENTS

An embodiment of the present invention will be described in detail hereinbelow with reference to the drawings.

Figure 1:
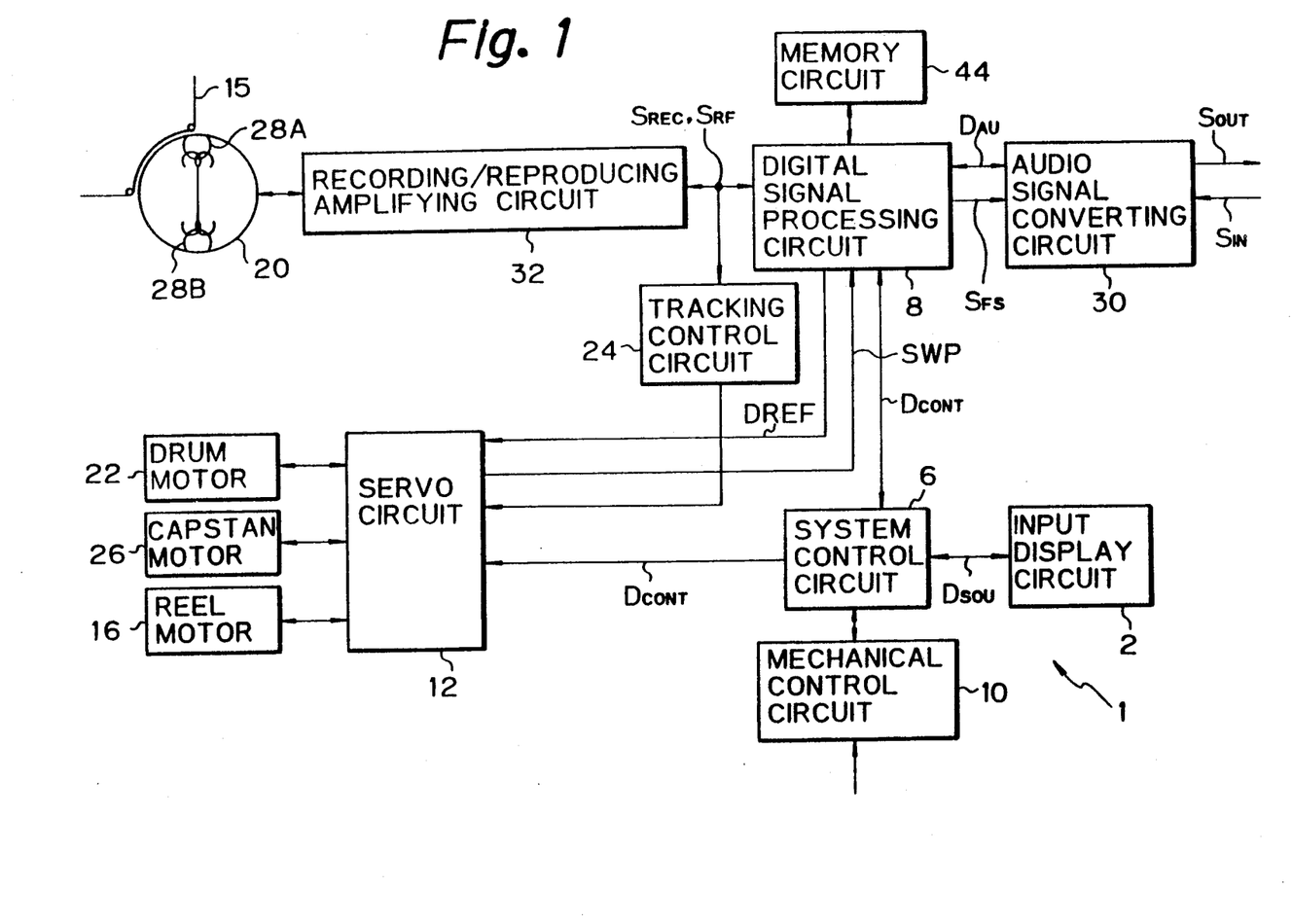
FIG. 1 is a block diagram showing a digital audio tape recorder according to an embodiment of the present invention.

In FIG. 1, reference numeral 1 denotes a digital audio tape recorder as a whole, in which audio signals SIN and SOUT are recorded and reproduced.

That is, in the digital audio tape recorder 1, an input display circuit 2, with an operation processing circuit construction, outputs operation data $D_{SOU}$ in response to the operation of an operator and also switches the display on a display panel on the basis of predetermined control data.

Therefore, in the digital audio tape recorder 1, the operating mode is switched in response to the operation of the operator and the operating state can be confirmed through the display of the display panel.

A system control circuit 6 produces control data and the like in response to the operation data $D_{SOU}$, thereby controlling the operation of the digital audio tape recorder 1.

At this time, the system control circuit 6 adds recording information to the control data which is output to a digital signal processing circuit 8 and outputs the resultant data upon recording. Thus, after the audio signal $S_{IN}$ is converted into the digital audio signal on the basis of the recording information, the digital audio signal is sequentially recorded on a magnetic tape 15.

A mechanical control circuit 10 drives and controls a loading/ejecting mechanism of a tape cassette, a magnetic tape loading mechanism, and the like on the basis of the control data.

A servo circuit 12 drives a reel motor 16 on the basis of the control data, thereby rotating a reel of a magnetic tape cassette (not shown) at a predetermined speed.

Further, upon recording and reproduction, the servo circuit 12 forms a switching pulse signal SWP whose signal level is switched at the starting time of the scanning of magnetic heads, and the servo circuit 12 drives a drum motor 22 in a manner such that the switching pulse signal SWP has a predetermined phase relative to a rotary drum reference signal DREF.

Therefore, the servo circuit 12 drives the drum motor 22 so as to once rotate a rotary drum 20 at every interleave period.

Further, the servo circuit 12 drives a capstan motor 26 so as to run the magnetic tape 15 at a pitch of two tracks at every interleave period. Due to this, upon recording, recording tracks are sequentially formed in a format which is standardized with respect to the digital audio tape recorder.

Moreover, upon reproduction, the servo circuit 12 executes a tracking control of the capstan motor 26 on the basis of a tracking error signal which is output from a tracking control circuit 24.

In the embodiment of FIG. 1, magnetic heads 28A and 28B are arranged on the rotary drum 20 having a diameter of 30 mm at an angle interval of 180°, and the magnetic tape 15 is wrapped at a wrap angle of 90°.

On the other hand, the rotary drum reference signal DREF is a reference signal of a duty ratio of 50% which is repeated at interleave periods of 60 msec and 30 msec in the LP mode and SP mode (long time recording mode and standard time recording mode), respectively.

An audio signal converting circuit 30 comprises an analog/digital converting circuit, a digital/analog converting circuit, and a low pass filter circuit. Upon recording, the audio signal converting circuit 30 executes a quantizing process to the input audio signal $S_{IN}$ and converts it into a digital signal on the basis of the recording information (that is, sampling frequency information and quantizing process information) which is output from the system control circuit 6.

On the other hand, upon reproduction, an inverse quantizing process is executed on the basis of the recording information which is obtained by reproducing the magnetic tape; and the digital audio signal $D_{AU}$, which is output from the digital signal processing circuit 8, is converted into the audio signal $S_{OUT}$ as an analog signal and is output.

Figure 2:
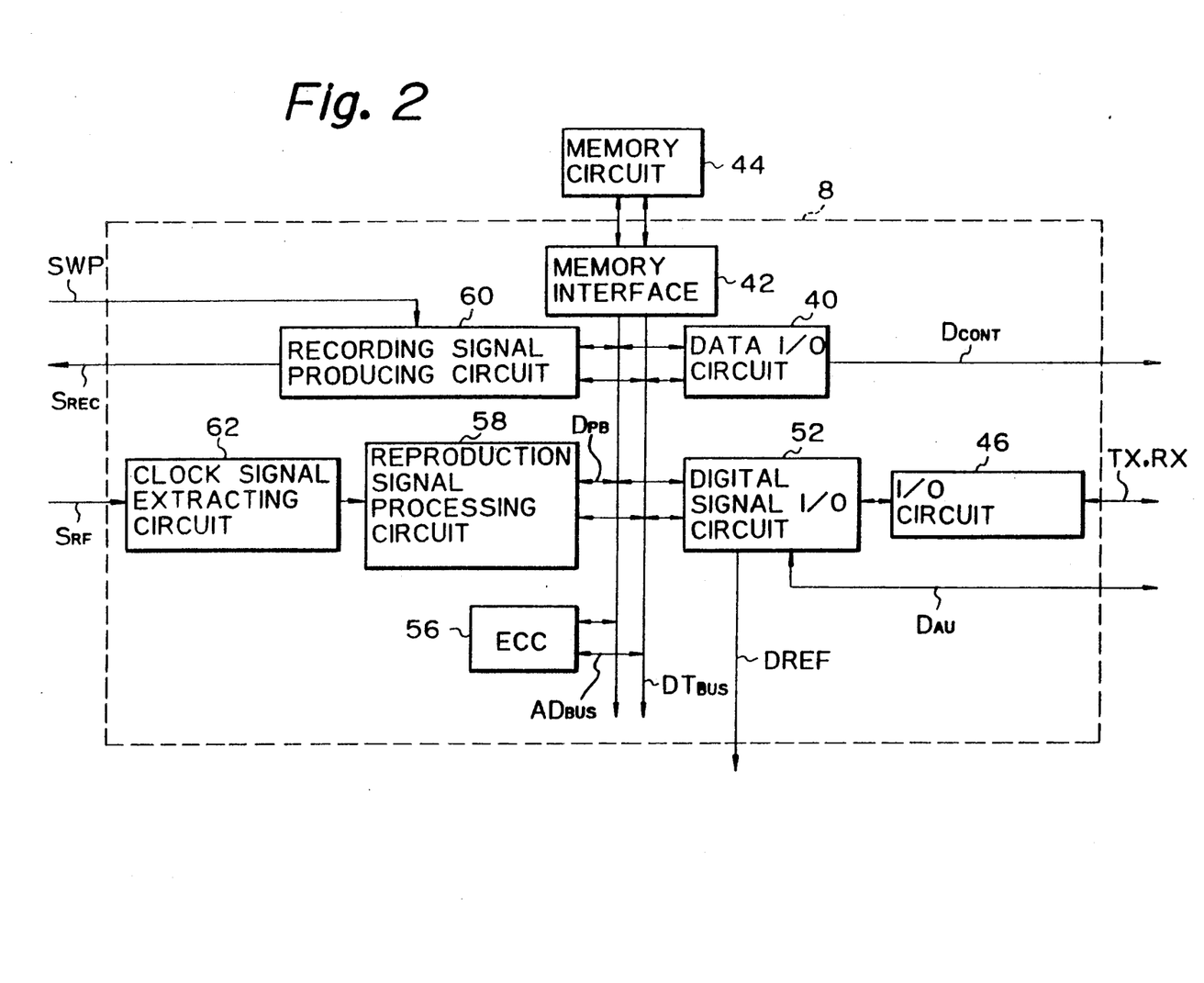
FIG. 2 is a block diagram showing a digital signal processing circuit.

As shown in FIG. 2, which illustrates the digital signal processing circuit 8, a data input/output circuit 40 receives control data $D_{CONT}$ which is output from the system control circuit 6 and stores the control data $D_{CONT}$ into a predetermined area of a memory circuit 44, through a memory interface circuit 42, thereby switching the operation of the digital signal processing circuit 8 on the basis of the control data $D_{CONT}$.

Further, the data input/output circuit 40 stores the recording information which is added to the control data $D_{CONT}$ and is input into a predetermined area in the memory circuit 44 upon recording. Upon reproduction, the data input/output circuit 40 outputs the recording information, which had been reproduced and stored into the memory circuit 44, to the system control circuit 6 and the audio signal converting circuit 30.

Upon recording, an input/output circuit 46 extracts audio data from a digital audio signal RX, having an AES/EBU format, which is input from an external apparatus of the digital audio tape recorder 1 and outputs the data to a digital signal input/output circuit 52. On the other hand, upon reproduction, the input/output circuit 46 synthesizes a digital audio signal TX of an AES/EBU format from the audio data which is output from the digital signal input/output circuit 52 and outputs the signal TX.

Thus, in the digital audio tape recorder 1, in addition to the audio signals $S_{IN}$ and $S_{OUT}$ as analog signals, the digital audio signals RX and TX of the AES/EBU format can be recorded and reproduced.

The digital signal input/output circuit 52 loads the control data $D_{CONT}$, which is output from the memory circuit 44 to a data bus $DT_{BUS}$ through the memory interface circuit 42, and switches the operation on the basis of the control data $D_{CONT}$.

The digital signal input/output circuit 52 sequentially counts predetermined clock signals in accordance with the recording information, thereby forming the rotary drum reference signal DREF in which one period is set to 60 msec and 30 msec in the LP and SP modes, respectively.

Further, the digital signal input/output circuit 52 selects and receives the digital audio signal which is output from the input/output circuit 46 or the audio signal converting circuit upon recording and divides the selected and received digital audio signal into blocks at an interleave period on the basis of the count value of a counter circuit to produce the rotary drum reference signal DREF.

At this time, the digital signal input/output circuit 52 sequentially outputs the digital audio signal to the memory interface circuit 42 by using the count value of the counter circuit as a reference, thereby interleaving the digital audio signal every block and producing the input audio data.

On the other hand, upon reproduction, the digital signal input/output circuit 52 sequentially receives the reproduction audio data, stored in the memory circuit 44, through the memory interface circuit 42. At this time, by sequentially receiving the reproduction audio data by using the count value of the counter circuit as a reference, the digital signal input/output circuit 52 deinterleaves the reproduction audio data.

Further, the digital signal input/output circuit 52 outputs the deinterleaved audio data to the input/output circuit 46 and the audio signal converting circuit 30 at a predetermined clock frequency on the basis of the reproduced sampling frequency information, thereby making it possible to output the digital audio signal TX or the audio signal SOUT as necessary.

An error detecting and correcting circuit 56 loads the control data $D_{CONT}$ at the interleave period from the memory circuit 44 and switches the operation in accordance with the control data $D_{CONT}$.

That is, the error detecting and correcting circuit 56 sequentially loads the input audio data stored in the memory circuit 44 upon recording and forms an outer code and an inner code for error detection and correction (comprising a C1 code and a C2 code) on a block unit basis and stores the codes in the memory circuit 44.

Further, the error detecting and correcting circuit 46 sequentially loads the subdata to be recorded into the subcode area from the recording information stored in the memory circuit 44 and forms an outer code for error detection and correction and stores the codes in the memory circuit 44.

On the other hand, upon reproduction, the error detecting and correcting circuit 56 executes the error correcting process using the inner and outer codes with respect to reproduction data D stored in the memory circuit 44.

At this time, the error detecting and correcting circuit 56 loads the error correction result which was detected by a reproduction signal processing circuit 58 from the memory circuit 44 together with the reproduction data $D_{PB}$, and repeats the error correcting process by using the error detection result.

A recording signal producing circuit 60 switches the operation in accordance with the control data $D_{CONT}$ and stops the operation upon reproduction in a manner similar to the digital signal input/output circuit 52.

On the other hand, upon recording, the recording signal producing circuit 60 sequentially loads the input audio data and the codes for error detecting and correction, which were stored in the memory circuit 44, and produces a recording signal $S_{REC}$ in accordance with a recording format of the digital audio tape recorder which is determined by the recording information.

At this time, with respect to the subdata (that is, comprising the recording information) which is recorded into the subdata area and main data area, the recording signal producing circuit 60 produces a simple parity code and converts the subdata and the parity code into the recording signal $S_{REC}$.

Further, the recording signal producing circuit 60 produces the recording signal $S_{REC}$ at a transmission rate of 4.075 mbps in the recording format of the LP mode and produces the recording signal $S_{REC}$ of a transmission rate of 9.408 mbps in the recording format of the SP mode. Thus, the digital audio signal is recorded in accordance with the format which was standardized with respect to the digital audio tape recorder.

Upon reproduction, a clock signal extracting circuit 62 extracts a reproduction clock signal from a reproduction signal SRF obtained through a recording/reproducing amplifying circuit 32 (FIG. 1) and outputs the reproduction clock signal together with the reproduction signal SRF to the reproduction signal processing circuit 58.

Upon recording, the reproduction signal processing circuit 58 stops the operation on the basis of the control data $D_{CONT}$. Upon reproduction, the reproduction signal processing circuit 58 demodulates the reproduction signal SRI by using a reproduction clock signal $CK_{PB}$ as a reference and, thereafter, it outputs the resultant reproduction data $D_{PB}$ into the memory circuit 44.

Figure 3:
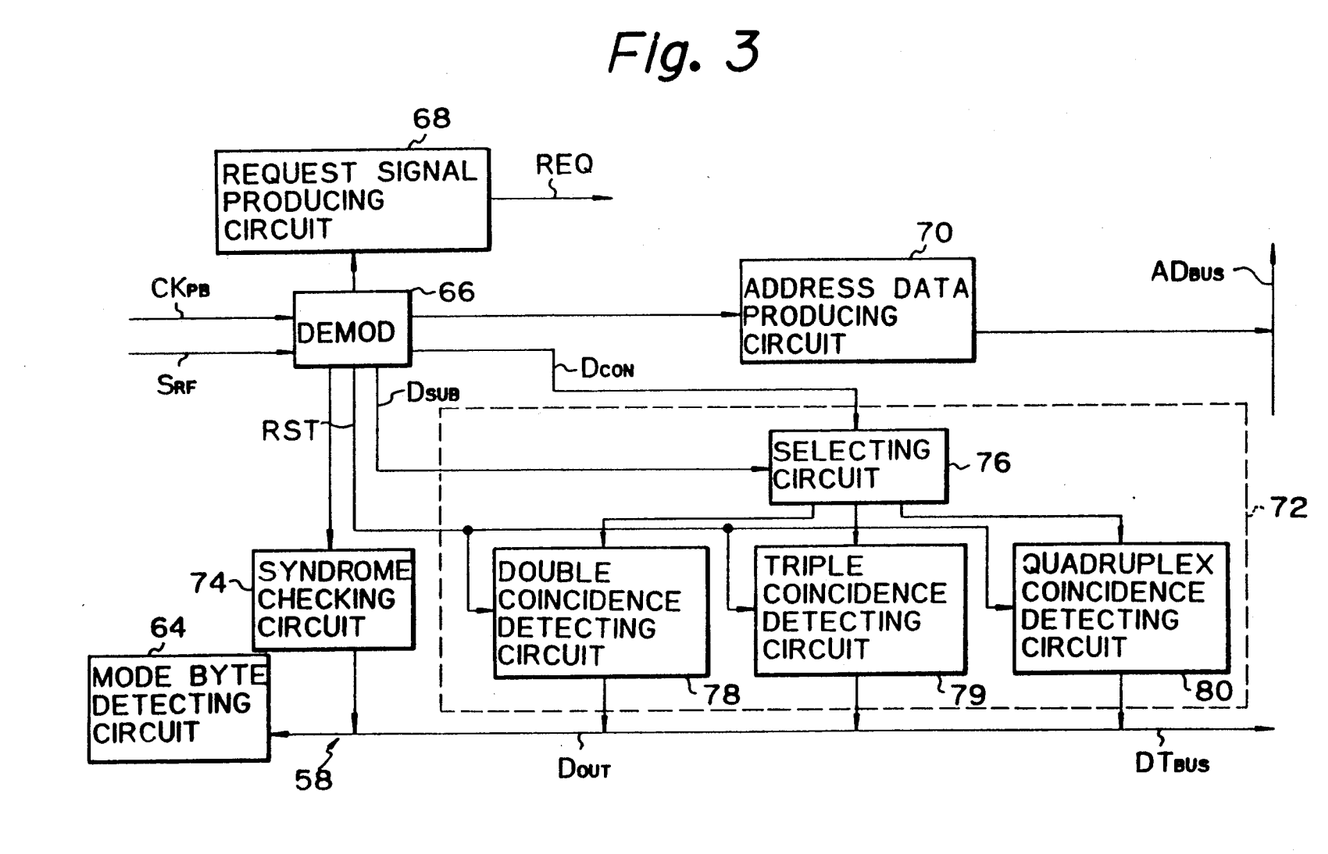
FIG. 3 is a block diagram showing a reproduction signal processing circuit.
Figure 4A:
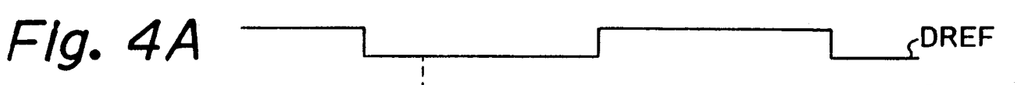
Figure 4B:
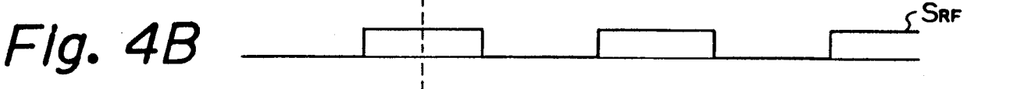
Figure 4C:
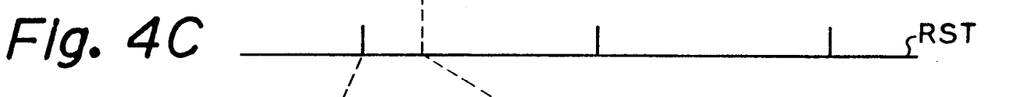
Figure 4D:
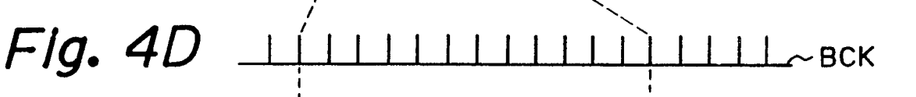
Figure 4E:
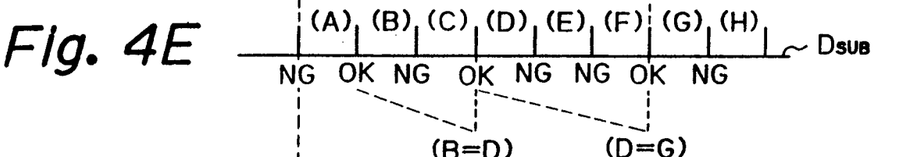
Figure 4F:
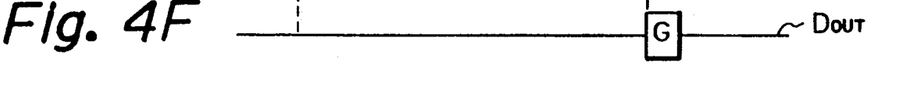
Figure 5A:
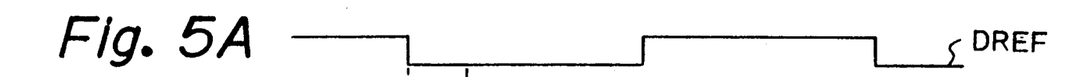
Figure 5B:
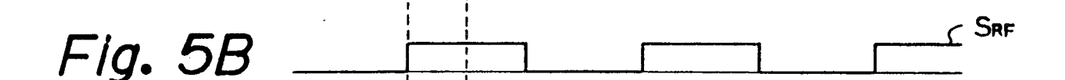
Figure 5C:
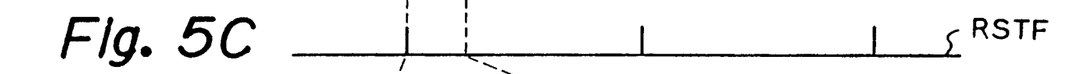
Figure 5D:
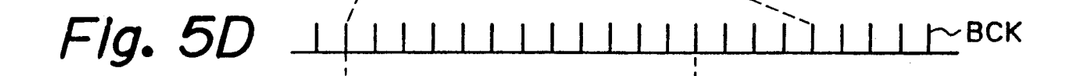
Figure 5E:
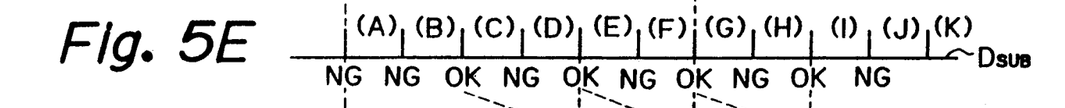
Figure 5F:
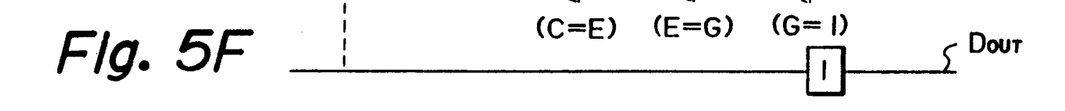

As shown in FIG. 3, the reproduction signal processing circuit 58 gives the control data $D_{CONT}$, which is output to the data bus $DT_{BUS}$ at the interleave period, to a mode byte detecting circuit 64.

Due to this, the reproduction signal processing circuit 58 switches the operation in accordance with a mode byte of the control data $D_{CONT}$.

Further, the reproduction signal processing circuit 58 gives the reproduction clock signal $CK_{PB}$ and reproduction signal $S_{RF}$ to a demodulating circuit 66, by which the reproduction signal $S_{RF}$ is demodulated.

Further, the demodulating circuit 66 detects a sync signal from the reproduction signal $S_{RF}$ and selects and outputs the demodulated reproduction data by using the sync signal as a reference, thereby to select and output the necessary data to a request signal producing circuit 68, an address data producing circuit 70, a multiplex coincidence circuit 72, and a syndrome checking circuit 74.

At this time, with respect to the subdata, the demodulating circuit 66 executes an error detecting process using the simple parity code and selectively outputs only the errorless data.

On the basis of an output signal of the demodulating circuit 66, the request signal producing circuit 68 outputs a write request signal REQ to the memory circuit 44 at a predetermined timing.

Therefore, in the reproduction signal processing circuit 58, after a write permission signal, which is returned from the memory interface circuit 42 in response to the write request signal REQ being input, predetermined data is output to the data bus $DT_{BUS}$, thereby sequentially storing the reproduction data, recording information, and the like in the memory circuit 44.

On the other hand, the address data producing circuit 70 sequentially produces address data and outputs such data to an address bus $AD_{BUS}$, using block addresses as references, thereby storing the reproduction data and the like in a predetermined area in the memory circuit 44.

On the other hand, the syndrome checking circuit 74 receives the audio data in the demodulated reproduction data together with the C1 and C2 codes and error detects the audio data by using the C1 code.

Further, the syndrome checking circuit 74 outputs the error detection result to the data bus $DT_{BUS}$ together with the audio data and the C1 and C2 codes at a predetermined timing, thereby storing the reproduced audio data and the like into a predetermined area in the memory circuit 44.

After the demodulated reproduction data $D_{PB}$ is once stored into the memory circuit 44, it is error corrected by the error detecting and correcting circuit 56 (FIG. 2). The error corrected reproduction data is sequentially output through the digital signal input/output circuit 52. Thus, the digital audio signal recorded on the magnetic tape 15 can be reproduced.

On the other hand, the multiplex coincidence circuit 72 supplies subcode data $D_{SUB}$, reproduced from the subdata area and main data area to a selecting circuit 76 to switch the contact on the basis of a switching signal $D_{CON}$ which is output from the demodulating circuit 66, thereby selectively outputting the demodulated recording information to a double coincidence detecting circuit 78, a triple coincidence detecting circuit 79, and a quadruplex coincidence detecting circuit 80, in accordance with the kind of the recording information.

That is, as shown in FIG. 4, the double coincidence detecting circuit 78 is reset by a reset signal RST (FIG. 4C) which is output from the demodulating circuit 66 at a timing when the rotary drum reference signal DREF (FIG. 4A) is switched (that is, timing when the reproduction signal $S_{RF}$ (FIG. 4B) rises at a time point when the magnetic heads 28A and 28B start the scan of the magnetic tape 15).

Further, the recording information which is input synchronously with a predetermined clock signal BCK (FIG. 4D) is selectively input to the double coincidence detecting circuit 78 through the selecting circuit 76, so that the double coincidence detecting circuit 78 receives the subdata $D_{SUB}$ (FIG. 4E) which is obtained from the subdata area and sequentially discriminates whether it coincides or not.

That is, among the sequential continuous subdata (A), (B), (C), ..., the subdata (B), (D), and (G) (shown by adding a symbol OK to a symbol NG indicative of an error detected subdata), in which no error was detected in the demodulating circuit, 66 are fetched. When a double coincidence result is obtained, the coincident subdata (G) is output to the data bus $D_{OUT}$ (FIG. 4F).

That is, in the subdata to be recorded into the subdata area, data ID, control ID, block addresses, and the like are assigned. Eight blocks are recorded in each recording track and different data is recorded every recording track.

Therefore, by selectively outputting the double coincidence subdata as mentioned above, the burden an the multiplex coincidence circuit 72 is reduced, and the subdata which was correctly reproduced in a practical range can be obtained.

Further, even in the case where the magnetic tape 15 is quickly fed to execute, for instance, a head search reproduction, the subdata of a practical accuracy can be obtained.

On the other hand, as shown in FIG. 5, in a manner similar to the double coincidence detecting circuit 78, the triple coincidence detecting circuit 79 is reset by the reset signal RST (FIG. 5C) which is output from the demodulating circuit 66 at a timing when the rotary drum reference signal DREF (FIG. 5A) is switched (that is, timing when the reproduction signal $S_{RF}$(FIG. 5B) rises).

Further, the triple coincidence detecting circuit 79 sequentially determines the coincidence regarding a predetermined main ID of the subdata $D_{SUB}$ (FIG. 5E) which is obtained from the main data area, with respect to the recording information which is input synchronously with a predetermined clock signal BCK (FIG. 5D).

That is, the triple coincidence detecting circuit 79 fetches the data (C), (E), (G), and (I) of the main ID, in which no error was detected in the demodulating circuit 66, among a format ID (ID0), an emphasis processing ID (ID1), a copy inhibition ID (ID6), and a pack ID (ID7). When the triple coincidence result is obtained, the data (I) of the coincident main ID is output to the data bus $D_{OUT}$(FIG. 5F).

Namely, the main ID (ID0, ID1, ID6, ID7) which is recorded into the main data area, is recorded into each block in the main data area, so that the main ID is recorded 128 times into one recording track.

Therefore, by selectively outputting the main ID in which the triple coincidence result was obtained as mentioned above, a main ID of a high reliability can be certainly obtained.

Consequently, in accordance with the kind of recording information, the recording information is selectively given to the double coincidence detecting circuit 78 and triple coincidence detecting circuit 80, and the recording information in which the double coincidence result is obtained and the recording information in which the triple coincidence result is obtained are stored in the memory circuit 44. Thus, the recording information which is sufficient and has a high reliability can be obtained by reducing the burden of the multiplex coincidence circuit 72.

Therefore, the reproduction data can be processed by using the recording information without checking the recording information by additionally providing an operation processing circuit and the like. The reproduction data can be processed with certainty, using a construction which is simpler in comparison to such an operation processing circuit.

Figure 6A:
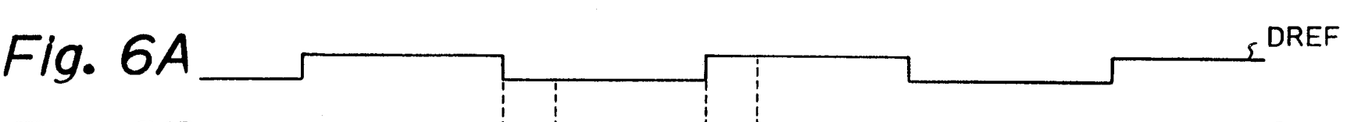
Figure 6B:
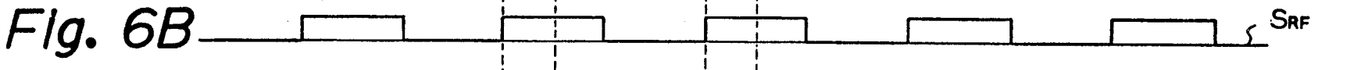
Figures 6C, 6D, 6E:
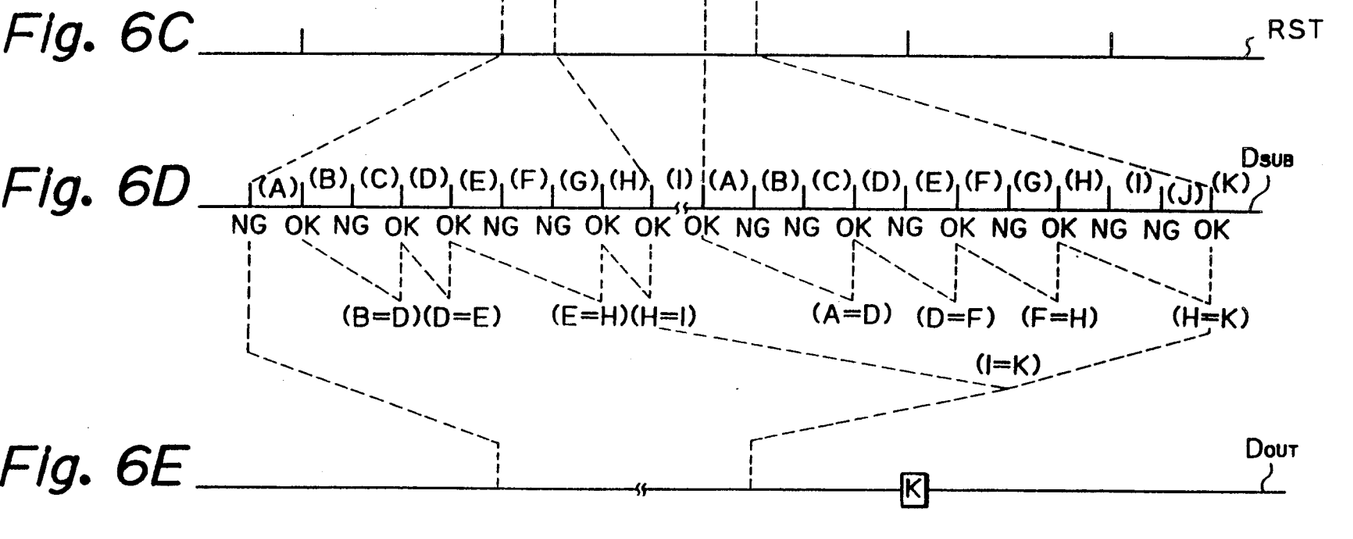

On the other hand, as shown in FIG. 6, the quadruplex coincidence detecting circuit 80 is reset by the reset signal RST (FIG. 6C) which is output from the demodulating circuit 66 at a timing when the rotary drum reference signal DREF (FIG. 6A) trails (that is, timing when the reproduction signal $S_{RF}$(FIG. 6B) rises at a time point when the magnetic head 28A in the magnetic heads 28A and 28B starts the scan).

Further, through the selecting circuit 76, the quadruplex coincidence detecting circuit 80 selectively receives the ID (ID2) indicative of the sampling frequency of the digital audio signal ID (ID3), indicative of the channel number of the digital audio signal ID (ID4) to, identify the quantizing process of the digital audio signal, and ID (ID5) indicative of the track pitch with respect to the main ID of the subdata $D_{OUT}$(FIG. 6E), obtained from the main data area, and sequentially discriminates the coincidence or dissidence.

Due to this, if the quadruplex coincidence result is obtained with regard to the data (B), (D), (E), (H) and (I) of the main ID in which no error was detected in the demodulating circuit 66, the data (I) of the coincident main ID is held. After that, from the subsequent start time point of the scan of the magnetic head 28B, with respect to the data (A), (D), (F), (H) and (K) of the main ID in which no error was detected in the demodulating circuit 66, the discrimination of the coincidence or dissidence is again sequentially performed.

When the quadruplex coincidence result is obtained, a check is made to see if the coincidence result is derived or not between the data (I) of the main ID which had first been held and the data (K) of the main ID in which the coincidence result was now obtained. When the coincidence result is derived, the data (K) of the coincident main ID is output to the data bus $D_{OUT}$ (FIG., 6E) at the subsequent scan start time point.

On the contrary, if the dissidence result is obtained, from the scan start time point of the subsequent recording track, the discrimination about the coincidence or dissidence is again sequentially performed with regard to the data of the main ID in which no error was detected in the demodulating circuit 66.

That is, when the main ID (ID2 to ID4) is recorded into the main data area, since the reproduced digital audio signal is converted into the analog signal, they are the necessary important recording information.

Therefore, if the main ID in which the quadruplex coincidence result is obtained, and which coincides among the recording tracks, is selectively output as mentioned above, the main ID of an extremely high reliability can be obtained.

Therefore, the recording information checking means such as an operation processing circuit and the like can be omitted as mentioned above and the reproduction data can be processed with certainty.

As mentioned above, the recording information is selectively given to the double coincidence detecting circuit 79, a triple coincidence detecting circuit 80, and a quadruplex coincidence detecting circuit 80 in accordance with the kind of the recording information. The recording information in which the double coincidence result was obtained, the recording information in which the triple coincidence result was obtained, and the recording information in which the quadruplex coincidence was obtained and which coincides among recording tracks (those recording information are hereinafter referred to as multiplex coincidence processed recording information) are respectively stored in the memory circuit 44. Thus, the burden of the multiplex coincidence circuit 72 can be reduced and recording information which is sufficient and has a high reliability can be obtained.

Therefore, on the basis of the recording information stored in the memory circuit 44, the audio data which was sequentially reproduced can be processed.

In the above construction, the memory interface circuit 42, control data input/output circuit 40, digital signal input/output circuit 52, reproduction signal processing circuit 58, recording signal producing circuit 60, and error detecting and correcting circuit 56 load the control data $D_{CONT}$ stored in the memory circuit 44 at predetermined timings, thereby switching the operation on the basis of the control data $D_{CONT}$.

That is, upon recording, after the digital audio signal was divided into blocks in the digital signal input/output circuit 52, it is interleaved and converted into the input audio data.

After the code for error detection and correction is formed by the error detecting and correcting circuit 56, the input audio data is converted into the recording signal $S_{REC}$ by the recording signal producing circuit 60 at the subsequent interleave period.

The recording signal $S_{REC}$ is sequentially output to the magnetic heads 28A and 28B and the digital audio signal can be sequentially recorded onto the magnetic tape 15.

On the other hand, after the reproduction clock signal $CK_{PB}$ is extracted by the clock signal extracting circuit 62, the reproduction signal $S_{RF}$ is demodulated by the reproduction signal processing circuit 58 and the reproduction data $D_{PB}$ is stored in the memory circuit 44.

At this time, in the subdata reproduced from the subdata area, with respect to the subdata in which no error was detected, the discrimination about the coincidence or dissidence is sequentially performed by the double coincidence detecting circuit 78. When the double coincidence result is obtained, the coincident subdata is output to the data bus $DT_{BUS}$.

Due to this, in the subdata reproduced from the subdata area, the subdata in which the double coincidence result was obtained is stored into the memory circuit 44.

On the other hand, in the main ID of the format ID (ID0), emphasis processing ID (ID1), copy inhibition ID (ID6), and pack ID (ID7), with regard to the data of the main ID in which no error was detected, the discrimination about the coincidence or dissidence is sequentially performed by the triple coincidence detecting circuit 79. If the triple coincidence result is obtained, the coincident main ID is output to the data bus $DT_{BUS}$.

Thus, in the main ID (ID0, ID1, ID6, ID7), the data of the main ID in which the triple coincidence result was obtained is stored in the memory circuit 44.

On the other hand, in the main ID (ID2 to ID4), with respect to the data of the main ID in which no error was detected, the discrimination about the coincidence or dissidence is sequentially performed by the quadruplex coincidence detecting circuit 80.

Due to this, the data of the main ID in which the quadruplex coincidence result was obtained and which coincides among recording tracks is output to the data bus $DT_{BUS}$ and stored into the memory circuit 44.

Thus, the recording information in which the number of multiplex coincidence processing times is selectively switched in accordance with the kind of the recording information can be stored in the memory circuit 44. The recording information of a high reliability can be obtained. The reproduction data can be certainly processed on the basis of the recording information.

According to the above construction, the number of multiplex processing times is selectively switched in accordance with the kind of recording information and the recording information in which the double coincidence result was obtained, the recording information in which the triple coincidence result is obtained, and the recording information in which the quadruplex coincidence result is obtained, and data which coincides among recording tracks are stored in the memory circuit 44. Thus, the recording information of a high reliability can be obtained by a simple construction and the reproduction data can be processed with certainty on the basis of the recording information.

The above embodiment has been described with respect to the case where the number of multiplex processing times is switched; and the recording information in which the double coincidence result is obtained, the recording information in which the triple coincidence result is obtained, and the recording information in which the quadruplex coincidence result is obtained, and data which coincides among recording tracks are stored into the memory circuit. However, the invention is not limited to the above case but various switching methods can be widely applied as necessary.

Further, the above embodiment has been described with respect to the case where the digital audio signal of the AES/EBU format and the audio signal as an analog signal are recorded and reproduced. However, the invention is not limited to the above case but can be widely applied to the cases where various signals are recorded and reproduced such as the case where only the digital audio signal of the AES/EBU format is recorded and reproduced, the case where only the audio signal as an analog signal is recorded and reproduced, and the like.

Moreover, although the above embodiment has been described with respect to the case where the invention was applied to the digital audio tape recorder, the invention is not limited to the above case. Further, the invention can be applied to an external memory device of an operation processing unit and the data which is input and output to/from operation processing unit can be also recorded and reproduced.

In addition, the invention is not limited to the magnetic recording and reproducing apparatus but can be widely applied to a digital audio tape recorder for only reproduction and, further, a magnetic reproducing apparatus for reproducing various data other than the audio signal.

What is claimed is:

1. A digital signal processing circuit having a memory circuit to store reproduction data and recording information, a reproduction signal processing circuit for demodulating a reproduction signal to thereby obtain reproduction data and recording information and for storing said reproduction data and said recording information into said memory circuit, an error detecting and correcting circuit for executing an error detecting and correcting process on said reproduction data, and a data output circuit for outputting the reproduction data stored in said memory circuit on the basis of said recording information, comprising:

a plurality of multiplex coincidence detecting circuits for sequentially detecting whether the recording information coincides or not, and for outputting the recording information in which the coincidence result is respectively obtained by only a predetermined number of times to said memory circuit; and a selecting circuit for selectively outputting the recording information to the plurality of multiplex coincidence detecting circuits in accordance with the kind of recording information.

2. A digital signal processing circuit according to claim 1, wherein said multiplex coincidence detecting circuit detects the coincidence or dissidence of the recording information between recording tracks and outputs the recording information in which the coincidence result was obtained to said memory circuit.

* * * * *